(12) United States Patent
Unru

(10) Patent No.: US 12,525,806 B2
(45) Date of Patent: Jan. 13, 2026

(54) METHOD FOR OPERATING A BATTERY CONVERTER, BATTERY CONVERTER AND SYSTEM

(71) Applicant: SMA Solar Technology AG, Niestetal (DE)

(72) Inventor: Alexander Unru, Baunatal (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 18/798,944

(22) Filed: Aug. 9, 2024

(65) Prior Publication Data

US 2024/0405557 A1 Dec. 5, 2024

Related U.S. Application Data

(63) Continuation of application No. 18/102,813, filed on Jan. 30, 2023, now Pat. No. 12,062,914, which is a
(Continued)

(30) Foreign Application Priority Data

Aug. 31, 2020 (DE) ..................... 10 2020 122 686.1

(51) Int. Cl.
*H02J 3/32* (2006.01)
*H02J 7/00* (2006.01)

(52) U.S. Cl.
CPC ............ *H02J 3/32* (2013.01); *H02J 7/00712* (2020.01); *H02J 2207/20* (2020.01)

(58) Field of Classification Search
CPC ....... H02J 3/32; H02J 7/00712; H02J 2207/20
See application file for complete search history.

(56) References Cited

U.S. PATENT DOCUMENTS

2013/0127396 A1 5/2013 Triebel et al.
2014/0035365 A1 2/2014 Yoo
(Continued)

FOREIGN PATENT DOCUMENTS

DE 102018119957 A1 2/2020
WO 2011154306 A2 12/2011

OTHER PUBLICATIONS

Jianfang Xiao et al; "Multi-level control of grid-tied DC microgrids"; 2013IEEE Pes Asia-Pacific Power and Energy Engineering Conference; Dec. 8, 20103; pp. 1-6.
(Continued)

*Primary Examiner* — Carlos Amaya
(74) *Attorney, Agent, or Firm* — Eschweiler & Potashnik, LLC

(57) ABSTRACT

A method for operating a battery converter in a system includes controlling an exchange power of the battery converter using a battery, which is connected to the battery converter, depending on a voltage of the intermediate circuit in accordance with a converter characteristic curve, identifying a decrease in the intermediate circuit voltage below a rectifying value of the permissible AC voltage of the grid connected to the inverter, and when the decrease is identified, temporarily shifting the converter characteristic curve so that a maximum discharging power of the battery converter is reached at a value of the intermediate circuit voltage that is above or at the rectifying value. A battery converter and a system having such a battery converter are also described.

12 Claims, 3 Drawing Sheets

Related U.S. Application Data continuation of application No. PCT/EP2021/072424, filed on Aug. 11, 2021.

(56) References Cited

U.S. PATENT DOCUMENTS

2021/0265841 A1* 8/2021 Brombach ............... H02J 3/38
2021/0313828 A1   10/2021 Brombach et al.

OTHER PUBLICATIONS

Dung H. Pham et al; "Microgrid topology for different applications in Vietnam"; Universities power engineering conference (AUPEC), 2012 22nd Australasian, IEEE; Sep. 26, 2012; pp. 1-6.
International Search Report dated Nov. 18, 2021 in connection with PCT/EP2021/072424.
Notice of Allowance dated Apr. 16, 2024 for U.S. Appl. No. 18/102,813.

* cited by examiner

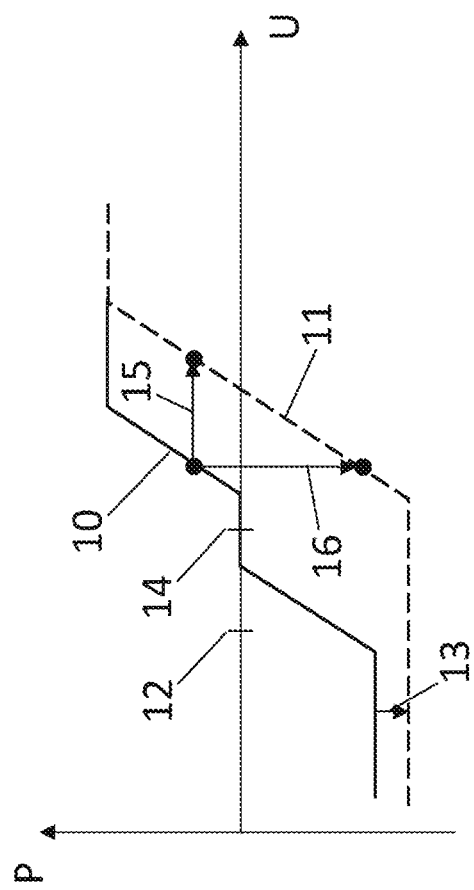

METHOD FOR OPERATING A BATTERY CONVERTER, BATTERY CONVERTER AND SYSTEM

CROSS REFERENCE TO RELATED APPLICATIONS

This Application is a Continuation of U.S. application Ser. No. 18/102,813, filed on Jan. 30, 2023, which is a continuation of International Patent Application number PCT/EP2021/072424, filed on Aug. 11, 2021, which claims priority to German Patent Application number 10 2020 122 686.1, filed on Aug. 31, 2020. The contents of the above-referenced patent applications are hereby incorporated by reference in their entirety.

FIELD DISCLOSURE

The disclosure relates to a method for operating a battery converter, a battery converter which is configured to carry out the method, and a system having such a battery converter.

BACKGROUND

For operating DC loads in a system, for example, in an industrial production plant, the DC loads are powered via a common DC bus. This DC bus is often connected to an AC grid via an inverter in order to ensure the power exchange required for operating the DC loads. In this case, the inverter ensures that the voltage of the DC bus, as an intermediate circuit voltage of an intermediate circuit via which the inverter is connected to the DC bus, remains within a permissible voltage range around a predetermined DC nominal value. In addition, such systems frequently have battery converters which provide a brief control reserve for voltage fluctuations which go beyond the capability of the inverter or which are caused by the inverter having further controlling tasks beyond the regulation of the DC bus voltage, for example, the provision of grid power services such as a frequency or voltage stabilization of the connected grid. The battery converter in this case determines the exchange power with the DC bus mostly via a predetermined converter characteristic curve which specifies the nominal value of the exchange power as a function of the intermediate circuit voltage. The controller of the battery converter then sets the exchange power according to the nominal value. Usually, the converter characteristic curve has a dead-band around the DC nominal value of the DC bus voltage, in which dead-band the battery converter is inactive. Within the scope of this disclosure, the term "DC load" is understood not only to mean pure loads, but also to include those components which temporarily or permanently supply power to the DC bus.

In order to enable an efficient operation of the system, it is desirable to set the DC nominal value of the DC bus voltage only slightly over a rectifying value of the AC grid connected to the inverter, since this can reduce the converter losses of the inverter.

At the same time, there is increasingly the requirement for a system as described above to provide grid-supporting services for the grid. As part of this grid-supporting operation, it is necessary for the inverter to attempt, in the event of a collapse of the grid voltage, at least for a predetermined time, to support the grid by means of a phase-correct feed of relatively high currents for the restoration of nominal values associated with the grid voltage on the grid (e.g. voltage amplitude, frequency). This behavior is referred to as FRT (fault ride-through). In the case of inverters which also provide a DC bus voltage on the DC side, according to the prior art, the consequence is that the intermediate circuit is discharged considerably and the voltage of the DC bus falls below the rectifying value of the nominal value of the grid voltage. In particular, such a drop in the DC bus voltage cannot be counteracted sufficiently by battery converters which are controlled via conventional converter characteristic curves if the DC nominal value is only slightly above the rectifying value.

If the DC bus voltage has dropped below the specified rectifying value, a sudden complete recovery of the grid voltage can lead to high currents flowing in an uncontrolled manner through the freewheeling diodes of the bridge circuit of the inverter into the discharged intermediate circuit of the DC bus such that these are destroyed.

SUMMARY

It is therefore an object of this disclosure to adapt the control of the battery converter in a system comprising a voltage-source inverter, a DC load and a battery converter with a connected battery such that a grid voltage suddenly returning in the event of a FRT does not damage the system.

In one aspect, a method according to the disclosure for operating a battery converter in a system in which, in addition to the battery converter, an inverter, which is connected to a grid, and a DC load are connected to a common intermediate circuit via a DC bus comprises controlling an exchange power of the battery converter using a battery which is connected to the battery converter, based on a voltage of the intermediate circuit in accordance with a converter characteristic curve. The method also comprises identifying a decrease in the intermediate circuit voltage below a rectifying value of the permissible AC voltage of the grid connected to the inverter, and if the decrease is identified, temporarily shifting the converter characteristic curve so that a maximum discharging power of the battery converter is reached at a value of the intermediate circuit voltage that is above or at the rectifying value.

By identifying the decrease, the battery converter can independently recognize, without any explicit signal from the outside, that there is the possibility that the system could be confronted with an FRT event. In this case, the control behavior of the battery converter is changed so that it attempts to keep the voltage of the DC bus within a voltage range above the rectifying value of the permissible AC voltage of the connected grid for a predetermined period of time. This counteracts the risk that damage to the inverter is caused by a sudden return of the permissible grid voltage after the end of the FRT event. In the normal operating case, i.e. also before detection of the decrease, it is the task of the inverter to keep the voltage of the DC bus within the permissible voltage range by providing a corresponding exchange power between the DC bus and the grid. The battery converter supports this control with the aid of the converter characteristic curve.

In one embodiment, the converter characteristic curve is shifted when the decrease is detected such that the battery is discharged with a maximum discharging power for values of the intermediate circuit voltage which are less than or equal to a limit voltage which, in one embodiment, is at least 10% above the rectifying value. As a result, an additional safety margin is created, which creates a safeguard, for example, when a brief overshoot of a voltage amplitude over the permissible value takes place when the grid voltage is restored. A briefly increased power consumption from the DC bus by the DC load or by the inverter or by other components can also be better compensated for.

For such cases, the control reserve of the battery converter can be further improved during the reaction to a decrease in the bus voltage by shifting the converter characteristic curve such that a maximum discharging power of the shifted converter characteristic curve is at least 20%, for example, at least 50%, above a maximum permissible continuous discharging power of the battery converter. Since this maximum discharging power is only provided for a short time, the battery converter can withstand this overload without damage.

In one embodiment, before the shifting, the converter characteristic curve has a dead-band around a DC nominal value of the intermediate circuit voltage, and the shifted converter characteristic curve is dead-band-free. A dead-band in the shifted characteristic curve in this situation would only worsen the control characteristic of the converter or unnecessarily broaden the voltage range in which the battery converter controls on the basis of the shifted characteristic curve, while the dead-band in normal operation represents a substantial relief for the battery converter and the battery connected thereto.

In one embodiment, the converter characteristic curve is shifted for a first time period, which is selected depending on a second time period for an FRT of the system, and which is, for example, selected to be greater than or equal to the second time period. This ensures that the battery converter provides its DC-bus-supporting function during the entire FRT event. In this case, the second time period of the FRT event comprises not only a phase in which the inverter actively attempts to support the grid and to suitably exchange power with the grid, but also, if necessary, a phase in which the inverter remains connected passively to the grid without the bridge switches being actively clocked, for example. Such a passive phase can also reproduce the FRT event and take several minutes without a prior active support phase. When the grid is restored within this time period, the inverter can become active again without the delay of a connection process with the grid required again, and can provide a suitably controlled power exchange with the grid.

After the second time period has elapsed, the FRT event would be successfully solved, or the inverter would disconnect from the connected grid. In this way, it is possible for the system to continue operation, by means of the battery converter, at least for a certain time. This continued operation can in principle be supported by the battery converter using the shifted characteristic curve, but also, in particular after the disconnection of the inverter from the grid, by the original converter characteristic curve.

In a further embodiment of the disclosure, and in addition to an input for connection to a battery, a battery converter has a controller configured to provide exchange power at an output depending on the voltage applied at the output depending on a converter characteristic curve. The controller is further configured to identify a decrease in the voltage applied at the output below a rectifying value of the permissible AC voltage of the grid connected to the inverter and, if the decrease is identified, to temporarily shift the converter characteristic so that a maximum discharging power of the battery converter is reached at a value of the voltage applied at the output that is above or at the rectifying value. The advantages indicated in the context of the method described above are obtained.

In a system according to the disclosure, such a battery converter is connected to a common intermediate circuit at its output via a DC bus. A DC load and an inverter are also connected to the intermediate circuit. The inverter is, for example, configured to be connected to a grid on the output side, and to supply the intermediate circuit or the DC bus with exchange power via the grid in such a way that the DC bus is operated within a permissible voltage range. The battery converter supports the inverter, for example, in that it provides further exchange power with a connected battery according to a predetermined converter characteristic curve. Direct communication between the inverter and battery converter to achieve the common control goal is not required here.

BRIEF DESCRIPTION OF THE FIGURES

The disclosure is illustrated below by means of figures, in which

FIG. 3 shows a converter characteristic curve and its shifting in the context of carrying out the method according to the disclosure.

DETAILED DESCRIPTION

Figure 1:
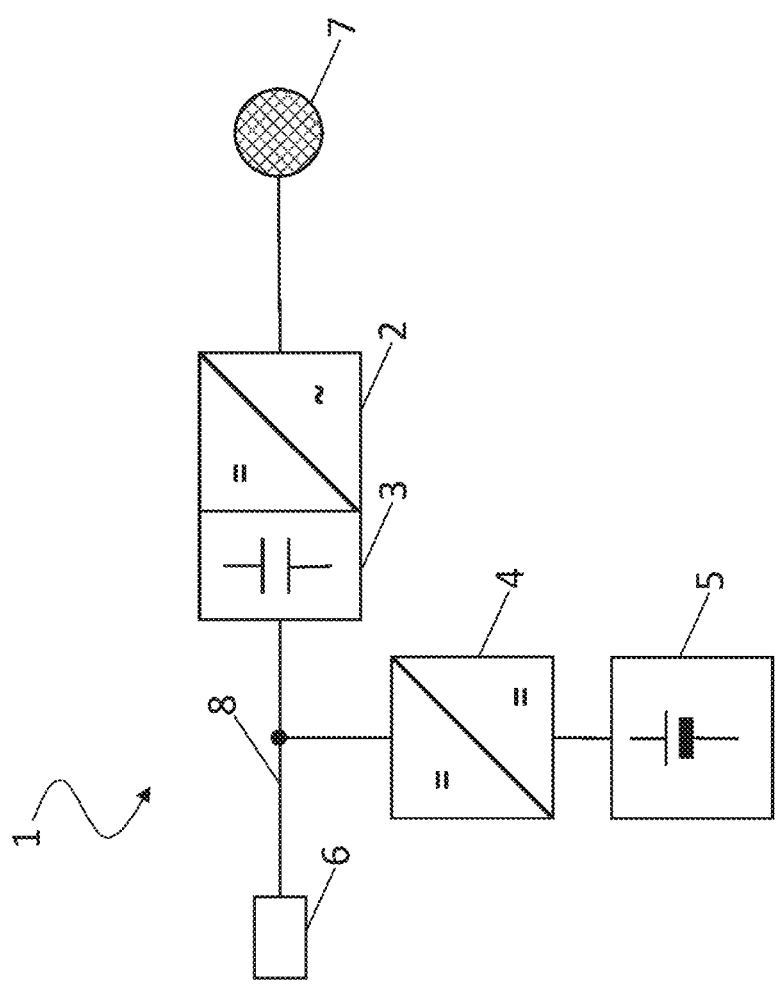
FIG. 1 shows a system for carrying out the method according to the disclosure.

FIG. 1 shows an embodiment according to the disclosure of a system 1 comprising an inverter 2 which is connected on the AC side to a grid 7 and on the DC side via an intermediate circuit 3 to a DC bus 8. In the example shown, the intermediate circuit 3 is part of the inverter, but it can also be an independent component of the system 1. A DC load 6 which is supplied with electrical power via the DC bus 8 is also connected to the DC bus 8. In order to compensate for fluctuations in the power consumption of the loads and the associated voltage fluctuations of the DC bus 8, a battery 5 is also connected to the DC bus 8 via a battery converter 4. The control of the battery converter 4 takes place via a converter characteristic curve that specifies a nominal value for an exchange power with the battery 5 for each value of the DC bus voltage. The exchange power of the battery converter 4 is set by a controller according to the nominal value. In this case, the converter characteristic curve does not necessarily have to be constant over time, but can, for example, be adapted as a function of the state of charge of the battery 5 in order to aim for a desired state of charge of the battery 5.

Furthermore, the controller of the battery converter 4 is configured to detect a decrease in the voltage applied to the DC bus 8 below a rectifying value of the permissible AC voltage of the grid 7 connected to the inverter 2, and if the decrease is detected, to temporarily shift the converter characteristic curve so that a maximum discharging power of the battery converter 4 is already reached at a value of the voltage applied at the output that is above or at the rectifying value 12 (see FIG. 3). Such a decrease can be triggered by an FRT event, which represents a special operating situation of the system 1. The time period during which the shifted characteristic curve is used by the battery converter to control its exchange power with the DC bus can, in one embodiment, be selected according to the time period during which the inverter 2 attempts, for example, to carry out an FRT on the basis of specifications of the grid operator in order to compensate for a voltage drop in the grid. In this way, the battery converter 4 supports the execution of the FRT without requiring direct communication between the inverter 2 and the battery converter 4.

Figure 2:
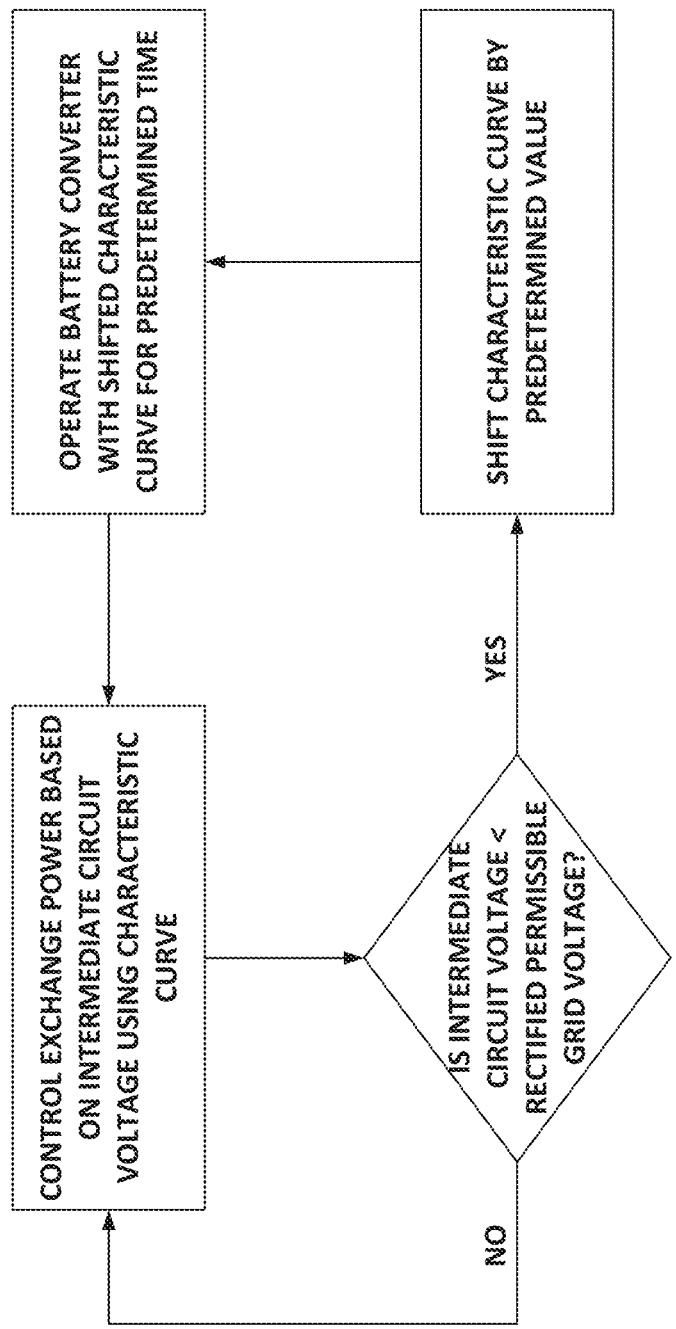
FIG. 2 shows a flowchart of the method according to the disclosure.

FIG. 2 shows a flowchart for the method according to the disclosure. In a first act S1, an exchange power of the battery converter with a battery connected to the battery converter is controlled depending on a voltage of the intermediate circuit according to a converter characteristic curve. This corresponds to a normal operating mode of the battery converter. In a second act S2, the battery converter checks the voltage at its output terminals connected to the intermediate circuit for whether there is a decrease in the intermediate circuit voltage below a rectifying value of the permissible AC voltage of the grid connected to the inverter. If no such decrease is detected (NO at S2), the method returns to S1.

If the decrease is detected (YES at S2), the converter characteristic curve is shifted by a predetermined voltage value at S3, so that an exchange power according to the characteristic curve is achieved at an intermediate circuit voltage increased by the predetermined voltage value. At S4, the battery converter is operated with the shifted characteristic curve for a predetermined time before the converter characteristic curve is reset to the original characteristic curve of the normal operating mode and the method returns to S1. This predetermined time can be selected, in one embodiment, according to the maximum time period in which the voltage-setting inverter is operated in the FRT mode, so that the battery converter supports the voltage of the intermediate circuit during the entire FRT event, with the aid of the shifted converter characteristic curve. Even if other causes have led to the temporary lowering of the intermediate circuit voltage, the temporary shift of the characteristic curve is performed.

FIG. 3 shows a converter characteristic curve 10 in which the nominal value of an exchange power P is shown as a function of the voltage U at the output terminals of a battery converter 4 that are to be connected to the DC bus. The converter characteristic curve 10 has a dead-band with constant power-zero in this case-around a DC nominal value 14 with dead-band regions adjacent on both sides, in which regions the exchange power P increases (or the discharging power decreases) with an increasing voltage in the direction of an increased charging power. These regions end upon reaching the maximum permissible continuous charging power or for decreasing voltage of the maximum permissible continuous discharging power, which are not exceeded in each case. This results in a voltage range with variable exchange power of the battery converter 4, wherein the rectifying value 12 of the permissible AC voltage of the connected grid is within this voltage range in the case shown.

If the battery converter 4 identifies a decrease in the voltage at its output terminals, the battery converter temporarily uses a shifted characteristic curve 11 instead of the converter characteristic curve 10. As a result, the shifted characteristic curve 11 is characterized, with respect to the converter characteristic curve 10, in that the assigned value of the DC bus voltage U for the shifted characteristic curve 11 is higher or at best the same for each value of an exchange power P between the maximum permissible continuous charging power and the maximum permissible continuous discharging power than the converter characteristic curve 10. At the same time, a maximum discharging power of the battery converter is already achieved at a value of the DC bus voltage that is above or at the rectifying value 12. In this way, the battery converter 4 operates, according to its capability, against a drop in the DC bus voltage below the rectifying value 12.

Unlike the converter characteristic curve 10, the shifted characteristic curve 11 does not comprise a dead-band. Optionally, the shifted characteristic curve can have a maximum discharging power which is increased by an overload 13 with respect to the maximum permissible continuous discharging power. Since the shifted characteristic curve 11 is only used for a predetermined time period, the voltage of the DC bus 8 can additionally be supported by the overload 13 without the risk of damage to the battery converter 4. The voltage at which the shifted characteristic curve 11 reaches a maximum discharging power should, in one embodiment, lie within the permissible voltage range of the DC bus 8.

The characteristic curves shown in FIG. 3 show only examples of profiles of converter characteristic curves and shifted characteristic curves. The profiles do not necessarily have linear sections, for example, and the gradients of the shifted characteristic curve do not necessarily have to correspond to the gradients of the converter characteristic curve. For each value of an exchange power P between the maximum permissible continuous charging power and the maximum permissible continuous discharging power, the assigned voltage U of the shifted characteristic curve is above the assigned voltage U of the converter characteristic curve. This is indicated by an arrow as a shift 15. Alternatively, for each voltage value U of the two characteristic curves, the associated power value P of the shifted characteristic curve has a power value which is shifted relative to the converter characteristic curve in the direction of a stronger discharge or a low charge, or the two characteristic curves at best have identical power values if the power value P corresponds to the maximum permissible continuous charging power or the maximum permissible continuous discharging power. This is indicated by an arrow as a shift 16.

What is claimed is:

1. A method for operating a system comprising a battery converter and an inverter connected to a grid, wherein both the battery converter and the inverter are connected to a common DC bus, the method comprising:
   controlling an exchange power of the battery converter in a first mode using a battery connected to the battery converter, wherein the controlling is based on a voltage of the common DC bus in accordance with a first converter characteristic curve,
   temporarily changing the controlling of the exchange power of the battery converter to a second mode upon detection of a fault ride-through (FRT) event, wherein in the second mode, the first converter characteristic curve is changed to a second converter characteristic curve,
   wherein, in the second converter characteristic curve, a maximum discharging power of the battery converter is reached at a DC bus voltage value that is higher than a DC bus voltage at which a maximum discharging power of the battery converter is reached in the first converter characteristic curve.

2. The method according to claim 1, wherein the first converter characteristic curve is changed such that the battery is discharged with the maximum discharging power for values of the DC bus voltage less than or equal to a limit voltage which is at least 10% above a rectifying value of a permissible AC voltage of the grid.

3. The method according to claim 1, wherein the converter characteristic curve comprises a dead-band around a DC nominal value of the DC bus voltage before the change, and the second converter characteristic curve is dead-band-free.

4. The method according to claim 1, wherein the second converter characteristic curve is changed from the first converter characteristic curve such that a maximum discharging power of the second converter characteristic curve is at least 20% above a maximum permissible continuous discharging power of the battery converter.

5. The method according to claim 4, wherein the maximum discharging power of the second converter characteristic curve is at least 50% above a maximum permissible continuous discharging power of the battery converter.

6. The method according to claim 1, wherein the second converter characteristic curve is changed with respect to the first converter characteristic curve for a first time period which is selected depending on a second time period of the FRT event.

7. The method according to claim 6, wherein the first time period is selected to be greater than or equal to the second time period.

8. A battery converter comprising an input for connecting to a battery and comprising a controller configured to provide an exchange power at an output configured to couple to a common DC bus, which couples to a grid via an inverter, the exchange power being provided based on a voltage applied at the output, the exchange power further being provided based on a converter characteristic curve, wherein the controller is further configured to identify a fault ride-through (FRT) event and if the FRT event is identified, to temporarily change the converter characteristic curve.

9. The battery converter of claim 8, wherein identifying the FRT event comprises detecting a decrease in the voltage applied at the output below a rectifying value of a permissible AC voltage of the grid connected to the inverter connected to the output, and wherein the temporary change comprises a change of the converter characteristic curve such that a maximum discharging power of the battery converter is reached at a value of the voltage applied at the output that is above or at the rectifying value.

10. The battery converter of claim 8, wherein the converter characteristic curve is changed such that a maximum discharging power of the changed converter characteristic curve is at least 20% above a maximum permissible continuous discharging power of the battery converter.

11. The battery converter of claim 8, wherein the converter characteristic curve is temporarily changed for a first time period which is selected depending on a second time period of the fault ride-through the FRT event.

12. The battery converter of claim 11, wherein the first time period is selected to be greater than or equal to the second time period.

* * * * *